United States Patent [19]

Loesch et al.

[11] 4,132,322
[45] Jan. 2, 1979

[54] SILO UNLOADER WINCH DRIVE

[76] Inventors: Leo J. Loesch; Claude E. Loesch, both of Rte. 1, Kimball, Minn. 55353

[21] Appl. No.: 788,227

[22] Filed: Apr. 18, 1977

[51] Int. Cl.² .................. B65G 65/38; B66D 1/24; F16H 37/06
[52] U.S. Cl. ............ 214/17 DB; 64/28 M; 74/665 B; 254/171; 254/187.1
[58] Field of Search .......... 214/17 DB; 302/56; 254/150 R, 171, 187.1, 186 R; 74/665 B, 665 G

[56] References Cited

U.S. PATENT DOCUMENTS

| 2,888,253 | 5/1959 | Van Dusen | 214/17 DB |
|---|---|---|---|
| 3,229,828 | 1/1966 | Kucera | 214/17 DB |
| 3,462,199 | 8/1969 | Harris et al. | 302/56 |
| 3,477,695 | 11/1969 | Noly | 254/150 R |
| 3,531,087 | 9/1970 | Wilson | 254/186 X |
| 3,539,058 | 11/1970 | Ferris | 214/17 |

*Primary Examiner*—Robert G. Sheridan
*Attorney, Agent, or Firm*—H. Dale Palmatier

[57] ABSTRACT

A winch with a cable suspending a silo unloader in a silo; the winch having a gear mechanism and an input shaft operating a worm; a reversible motor connected with the input shaft; an incremental drive for incrementally turning the input shaft for incrementally paying out the cable including a slow speed motor with a revolving eccentric operating an oscillating drive arm, with a pawl to incrementally rotate a ratchet wheel coupled by a magnetic clutch to a drive plate affixed on the input shaft.

14 Claims, 4 Drawing Figures

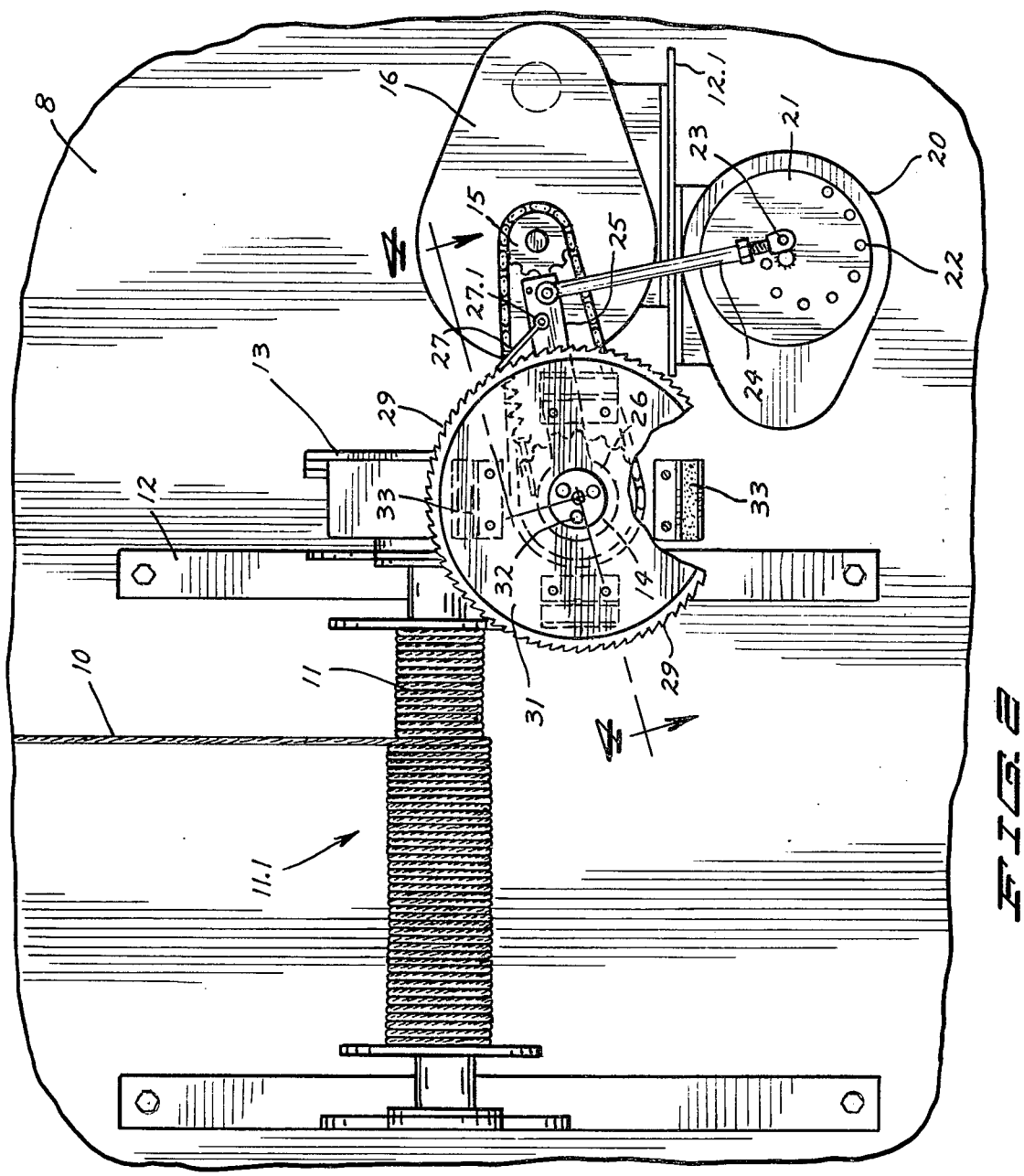
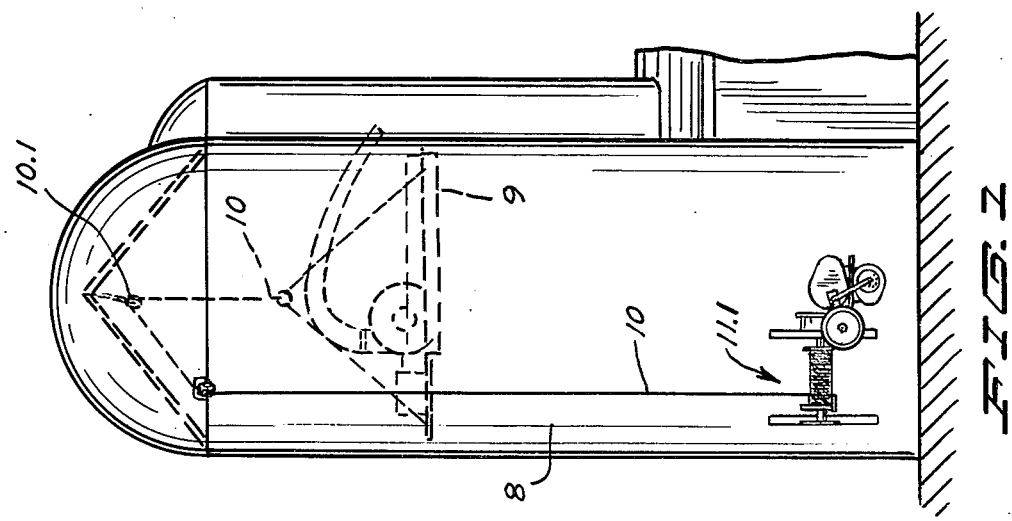

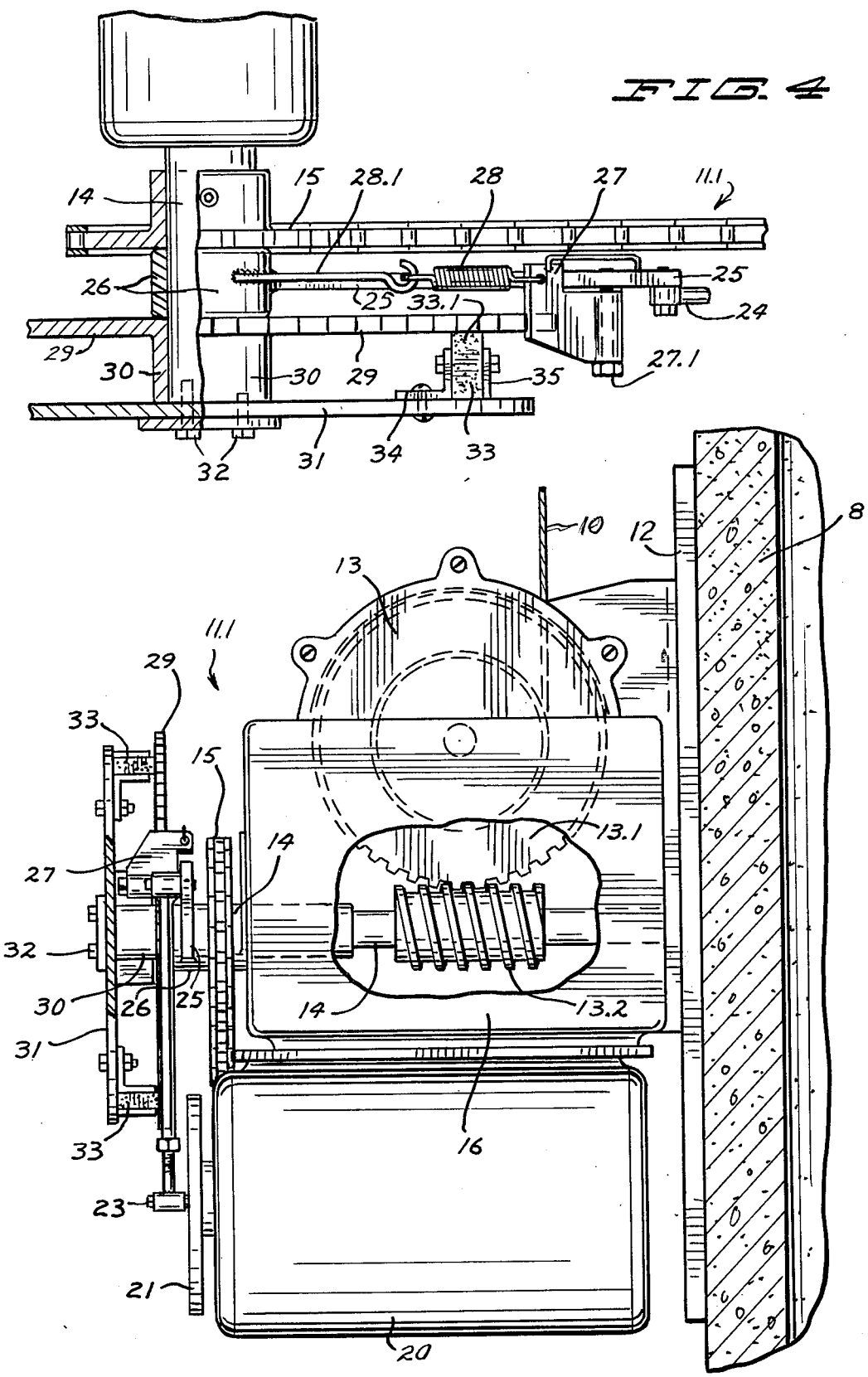

SILO UNLOADER WINCH DRIVE

This invention relates to winch control apparatus providing for the paying out and reeling in a cable, and particularly suited to manipulating a silo unloader.

BACKGROUND OF THE INVENTION

A silo unloader is usually suspended by a cable from the top of the silo so that the unloader mechanism is just above the topmost level of the silage in the silo. The silo unloader incorporates a mechanism that travels around the inside of the silo wall such that it simultaneously loosens and conveys the silage for delivery through conveying tubes downwardly to feed bunks in adjacent animal pens. As the silage is used, the silo unloader must be progressively lowered in the silo so that it will stay in contact with the top surface of the silage in the silo.

Accordingly, the silo unloader must be very slowly lowered in the silo at a rate which is equal to the rate at which silage is loosened and conveyed out of the silo. It will therefore be recognized that the cable suspending the silo unloader must be payed out from its control winch very, very slowly.

It is also very desirable that the silo unloader be rapidly raised and lowered so as to lift the unloader off the silage after a sufficient quantity of the silage has been discharged to accomplish feeding the animals; and of course it is desirable to lower the silo unloader quickly onto the silage whenever the silo unloader is again to be put into operation. This lifting of the unloader off the silage minimizes the likelihood of problems due to extremely cold conditions wherein the silo unloader may actually freeze to the surface of the silage in the silo.

Previously, in order to very slowly lower the silo unloader to keep the unloader working into the face of the silage, it has been common practice to briefly operate the winch motor, by simply instantaneously touching the start button, and immediately releasing it. This is sometimes called "bumping" the switch; but this practice does not accomplish the maintenance of a uniform pressure by the silo unloader against the top of the silage so that the silage will be uniformly loosened and conveyed out of the silo.

SUMMARY OF THE INVENTION

The present invention provides a very slow supplemental drive for turning the worm of the winch gear mechanism at an extremely slow rate on a substantially continuous basis in order to very slowly pay out the cable which suspends the silo unloader. The supplemental drive acts on the same input shaft to the worm - worm gear mechanism as does the conventional winch drive motor which is utilized to rapidly turn the input drive shaft. A magnetic clutch is interposed between the supplemental drive and the input drive shaft so as to allow the input shaft to turn rapidly in either direction under the impetus of the conventional winch drive motor, without effect upon the supplemental drive to incrementally turn the shaft and worm gear mechanism for lowering the silo unloader.

BRIEF DESCRIPTION OF THE DRAWINGS

FIG. 1 is a general elevation view of a typical farm silo with a silo unloader.

FIG. 2 is an elevation view of the winch control apparatus.

FIG. 3 is a side elevation view of the winch control apparatus.

FIG. 4 is an enlarged detail section view taken approximately at 4—4 in FIG. 2.

DETAILED SPECIFICATION

One form of the invention is shown in the drawings and is described herein. The silo 8 has a silo unloader mechanism 9 therein resting upon the top surface of the silage. The silo unloader 9 is of the type which travels over the top surface of the silage, loosening the silage, conveying the silage toward the center of the silo, and then rapidly propelling the silage so that it can be conveyed by chutes or pipes down to the feed bunks in the pens adjacent the silo.

The silo unloader 9 is suspended by a cable 10 which is guided by pulleys 10.1 on the superstructure of the silo from which the cable extends downwardly to nearly ground level where the cable is wound upon the drum 11 of the winch mechanism 11.1. The winch mechanism is mounted on a pair of upright rigid frame members or channels 12 which are affixed to the sidewall of the silo 8, as by lag screws or other suitable mechanical fasteners. The winch mechanism includes a gear housing 13 which confines a worm gear 13.1 and a worm 13.2. The worm gear 13.1 is connected directly to the winch drum 11; and the worm 13.2 is mounted on and rotates with an input shaft 14 which extends to the exterior of the gear housing 13.

The shaft 14 may turn in either direction for raising and lowering the silo unloader 9 in the silo.

A chain and sprocket 15 provides the driving connection between the shaft 14 and a reversible motor 16 which turns the shaft 14 sufficiently rapidly so that the silo unloader 9 will be rapidly lifted off the face of the silage in the silo, or lowered to the face of the silage in the silo, depending upon whether it is desired to render the silo unloader operational or inoperative. It will be recognized that the motor 16 incorporates internal gearing so that the output speed of the motor at the sprockets will be in the range of 50 to 120 rpm.

A supplemental drive mechanism is provided for incrementally paying out cable 10 so as to approximately match the descent of the silo unloader 9 with the rate at which the silage is loosened and conveyed out of the silo. A slow speed motor 20 is suspended with motor 16 on a frame bracket 12.1 and has a rotary drive plate 21 connected to the output shaft which revolves rather slowly, in the range of 30 to 75 rpm. The plate 21 has a plurality of eccentric holes 22 spaced at varying distances from the rotation axis of the output shaft, and an eccentric pin 23 is secured in one of the holes 22 for mounting the end of a reciprocating rod 24 which may be adjustable in length, as illustrated.

The upper end of the reciprocating rod 24 is connected by a pin to the outer end of an oscillating drive arm 25 which is affixed upon a cylindrical bearing sleeve 26 which is freely mounted on the shaft 14 adjacent the chain and sprocket connection to motor 16. The shaft 14 may freely rotate within the sleeve bearing 26 as hereinafter more fully described.

The oscillating drive arm 25 has a pawl 27 swingably mounted thereon and carried by a mounting pin 27.1. A coil spring 28 is connected to the pawl 27 at one end and is anchored at the other end to a rigid mounting rod or finger 28.1 which is affixed as by welding to the bearing sleeve 26. The spring 28 continuously draws the pawl 27 inwardly against the toothed peripheral edge of a ratchet wheel 29 which has a central mounting hub or sleeve 30 also freely mounted upon the input shaft 14 of the gear mechanism. Accordingly, the shaft 14 may turn freely with respect to the ratchet wheel 29.

A rigid rotor or drive plate or coupling 31 is affixed onto the end of shaft 14 by cap screws 32 so that the plate 31 lies in closely spaced and confronting relation with the steel ratchet wheel 29. The plate 31 is thereby affixed to the shaft 14 so as to continuously revolve with the shaft.

A plurality of ceramic magnets 33 are affixed on the inner face of plate 31 by means of aluminum brackets 34 and clamping plates 35; and the magnets 33 are positioned so that each has a pole face 33.1 in flush engagement with the side face of the adjacent steel ratchet wheel 29. The ceramic magnets 33 cumulatively provide a magnetic clutch between the ratchet wheel 29 and the drive plate 31 so that the drive plate 31 is, in most circumstances, turned incrementally as the ratchet wheel 29 is incrementally revolved by the oscillating pawl 27 and drive arm 25. The teeth on the ratchet plate 29 and the arrangement of the pawl 27 on the drive arm 25 is such, in relation to the gearing in the gear case 13 and the direction of winding of the cable 10 on the drum so that the cable will be incrementally payed off the drum as the ratchet wheel 29 is incrementally revolved by the oscillating movement of the arm 25 and pawl 27.

In the normal operation of the apparatus, it may be assumed, initially, that the silo unloader 9 is in operative position on the top surface of the silage in the silo. A portion of the weight of the silo unloader 9 will be carried by the cable 10 so that the unloader will not dig into the silage excessively, but will smoothly loosen and carry away reasonable quantities of the silage. While the silo unloader 9 is operating, the motor 20 will usually be operating so as to revolve the eccentric pin 23 and cause the drive arm 25 to oscillate with a rocking motion. As the pawl 27 oscillates upwardly and downwardly, the ratchet wheel 29 will be moved incrementally each time the pawl 27 moves upwardly.

As the ratchet wheel 29 revolves, with the magnets 33 coupled thereto, the magnets will transmit the rotary motion of the ratchet wheel to the plate 31 so that the shaft will be rotated at the same speed as is the ratchet wheel 29. It will therefore be recognized that the shaft 14 will be very slowly revolved so that the drum 11 is also slowly revolved to pay out cable 11 from the winch for the purpose of slowly lowering the silo unloader 9 in the silo. Preferably, the rate of lowering of the unloader 9 in the silo substantially equals the rate at which the face of the silage in the silo is lowered by reason of conveying out silage from the silo. In the event that the rate of paying out the cable 10 is not fast enough, the eccentric pin 23 may be moved to one of the other holes in plate 21 so that the length of oscillating stroke of drive arm 25 is increased, thereby causing the pawl 27 to increase the number of teeth on the ratchet wheel which are moved each time the drive arm 25 is oscillated.

When an adequate supply of silage from the silo has been loosened and conveyed out of the silo and into the nearby feed bunks, the silo unloader 9 will be shut down and simultaneously the motor 20 will be turned off so as to terminate the paying out of cable from the winch drum. Of course, the control of the electric motor on the silo unloader 9 may be coordinated by automatic controls with the controls for motor 20.

Furthermore, suitable controls may be provided to sense the amount of current being drawn by the unloader 9 so that when the amount of current drawn by the motor for the unloader 9 becomes excessive, the motor 20 may be shut down so as to eliminate any further lowering of the unloader 9 in the silo until the current in the unloader motor reduces to a reasonable level, whereupon the motor 20 may be reenergized again, automatically.

During certain operating conditions, it may be desirable to lift the unloader 9 entirely off the surface of the silage in the silo, after the operational cycle has been completed. For instance, it has been found that during winter months, cold temperatures will cause the unloader 9 to actually freeze solid to the silage in the silo, making it very difficult to reenergize the unloader again, thus making it desirable to entirely disengage the unloader from the silage at the end of an operating cycle. The unloader may be raised quickly off the silage by operating motor 16 so that the shaft 14 is rapidly revolved to wind the cable 10 onto the drum for the purpose of raising the unloader 9. Subsequently, when the unloader 9 is to be put into operation again, motor 16 may be operated in a reverse direction as to lower the unloader 9 onto the silage again.

In rapidly lowering the unloader 9 onto the silage, which is caused by rapidly paying out cable 10 from the winch drum through operation of motor 16, the shaft 14 is revolved under the influence of the chain and sprocket drive connection 15. When the shaft 14 is thus revolved, plate 31 is turned with it and the magnetic coupling provided by magnets 33 cause the ratchet wheel 29 to also revolve without obstruction by pawl 27.

When the motor 16 is reversed to rapidly wind the cable 10 onto the drum, the chain and sprocket drive connection 15 again revolves the shaft 14, but in the opposite direction, and again, the drive plate 31 is revolved with the shaft. In this mode of operation, the tendency is for the magnets 33 to drive the ratchet wheel 29 in a reverse direction, but this is prohibited by action of the pawl 27 on the teeth of the ratchet wheel, and as a result, the magnets 33 simply slide along the flat face at the side of the ratchet wheel. This slip characteristic in the magnetic clutch provided by the magnets 33 will immediately render the apparatus operational again as soon as the reverse turning of the shaft is completed so that the motor 20 may be again operated for the purpose of incrementally lowering the silo unloader in the silo.

It will be seen that we have provided a new and improved apparatus for incrementally lowering the silo unloader in a silo by incrementally paying out cable from the winch under the influence of an oscillating drive arm driven by a rotary eccentric operated by a slow speed motor. The incremental drive apparatus does not interfere with the conventional reversible drive for rapidly lowering and raising the unloader 9 in the silo.

What is claimed is:

1. A drive mechanism for a cable, comprising
a winch including a drum upon which such a cable is wound and payed out and a speed-reducing gear mechanism including an input shaft to revolve a worm,
a reversible motor having an output shaft connected to the input shaft by chain and sprockets to rapidly revolve the input shaft and drum, a slow speed motor with an output eccentric, an oscillatable drive arm freely mounted on one of said shafts for rocking movement and having a drive pawl thereon, the drive arm being connected to the output eccentric of the slow speed motor, a ratchet wheel of magnetic material on said one shaft and being freely rotatable with respect to said one shaft, the ratchet wheel engaging the drive pawl to be rotated thereby, and a drive plate affixed to said one shaft and rotatable therewith in face-to-face and spaced relation to the ratchet wheel, the plate having a plurality of magnets affixed thereto and bearing against the side of the ratchet wheel and defining a releasable drive connection to the ratchet wheel.

2. The drive mechanism according to claim 1 and the drive plate being affixed on the end of said one shaft, the ratchet wheel and drive arm having mounting collars on said one shaft and between the chain sprocket and the drive plate.

3. The drive mechanism according to claim 1 and the ratchet teeth of the ratchet wheel and the drive pawl thereon being oriented with respect to the winch to turn the drum to pay out cable in response to turning of the wheel by oscillating the pawl.

4. A drive mechanism for a winch with a worm gear speed reducing mechanism, comprising a reversible motor having a non-slip driving connection for coupling to such a speed reduction mechanism, a rotary coupling means in driving relation to said driving connection, a rotary driver adjacent the coupling means, powered means incrementally and repeatedly turning the rotary driver and including a source of oscillating motion, and a clutch between the rotary driver and the coupling means and having a torque responsive slip characteristic to slip in response to predetermined torque applied therethrough.

5. The drive mechanism according to claim 4 and the clutch including a magnet between the driver and coupling means of which the magnet is affixed to one and magnetically attracted and releasably attached to the other to permit such slipping.

6. The drive mechanism according to claim 4 and the coupling means and driver having a common axis of rotation.

7. The drive mechanism according to claim 4 and the powered means including a mechanical oscillator with a unidirectional power transmitting characteristic connected with the rotary driver to revolve the rotary driver in only one direction.

8. The drive mechanism according to claim 7 and the oscillator, coupling means and driver having common axis of rotation.

9. The drive mechanism according to claim 4 and both the coupling means and driver having planar portions lying parallel to each other.

10. A drive mechanism for manipulating a cable to raise and lower a silo unloader, comprising a winch including a drum with which such a cable is wound and payed out and a speed reducing gear mechanism including an input shaft to revolve a worm, a reversible motor having an output shaft and a driving connection to the input shaft to rapidly revolve the input shaft and drum, a rotor affixed to one of the shafts to apply torque thereto, a wheel freely rotatable on said one shaft adjacent the rotor, an oscillatable drive arm adjacent the wheel and having mounting means permitting rocking oscillation of the arm adjacent the wheel periphery, the drive arm having unidirectional driving means thereon engaging the wheel periphery and incrementally turning the wheel when rocked in one direction and freely moving along the wheel periphery when rocked in the opposite direction, a source of oscillating motion attached to said arm for producing such rocking oscillation thereof, and a magnetic clutch effecting a direct drive between the rotor and the wheel for turning the rotor, said one shaft and drum in response to turning of the wheel, the magnetic clutch having a slip characteristic to slip in response to predetermined torque applied thereto.

11. The drive mechanism according to claim 10 and the magnetic clutch including a plurality of magnets affixed on the rotor and having pole faces engaging a continuous peripheral surface of the magnetic material in the wheel.

12. The drive apparatus according to claim 11 and said magnets being permanent magnets.

13. The apparatus according to claim 10 and said winch turning in a direction to pay out the cable in response to rocking of said drive arm in said one direction and corresponding turning of the wheel.

14. Apparatus for raising and lowering a silo unloader in a silo, comprising frame means affixed to the silo and having a winch with a drum, a cable on the drum and depending from the top of the silo for attachment to the silo unloader and guide means at the top of the silo directing the cable between the silo unloader and the winch drum, the winch including a speed reducing gear mechanism including an input shaft to revolve a worm to turn the drum, a reversible motor on the frame means and having an output shaft connected to the input shaft by chain and sprockets to rapidly revolve the input shaft and drum for winding and paying out the cable, a slow speed motor on the frame means and having a rotary output eccentric, an oscillatable drive arm freely mounted on one of said shafts for rocking movement and having a drive pawl thereon, the drive arm having a rigid link swingably connected thereto and to the output eccentric of the slow speed motor and producing rocking movement of the drive arm when the slow speed motor is operated, a ratchet wheel of magnetic material being freely rotatable on said one shaft adjacent said drive arm, the pawl of the drive arm engaging the peripheral ratchet teeth of the ratchet wheel to incrementally rotate the ratchet wheel as the drive arm is oscillated, a coupling plate affixed to the end of said one shaft and rotatable therewith in face-to-face and spaced relation to the ratchet wheel, and clutch means on the coupling plate and including a plurality of permanent magnets affixed on the plate and bearing against the side of the ratchet wheel to produce rotation of the plate and said one shaft when the ratchet wheel is revolved, the magnets transmitting torque from the ratchet wheel to the coupling plate until a predetermined torque is reached, after which the magnets will slip relative to the ratchet wheel, the ratchet teeth and pawl of the drive arm being oriented to turn said one shaft and drum for paying out the cable from the drum when the pawl turns the ratchet wheel.

* * * * *